United States Patent Office 3,179,697
Patented Apr. 20, 1965

3,179,697
PROCESS FOR THE PRODUCTION OF AMINO HYDROXYETHERS
John A. Frump, Terre Haute, Ind., assignor to Commercial Solvents Corporation, New York, N.Y., a corporation of Maryland
No Drawing. Filed May 9, 1960, Ser. No. 27,468
17 Claims. (Cl. 260—570.6)

My invention relates to a process for producing amino hydroxyethers, and more particularly it relates to a process for producing amino hydroxyethers having the following general formula:

$$R-\underset{\underset{NH_2}{|}}{\overset{\overset{R}{|}}{C}}-(CH_2)_x-R_1$$

wherein R is a member selected from the group consisting of lower alkyl, lower hydroxyalkyl and a radical having the formula:

$$-(CH_2)_x-R_1$$

wherein $R_1$ is a member selected from the group consisting of the radicals:

$$-[O-CH_2-CH]_y OH$$
$$\qquad\qquad\quad |$$
$$\qquad\qquad\quad R_2$$

and $$-O-CH_2-CH-CH-CH_2-O-\underset{\underset{NH_2}{|}}{\overset{\overset{R}{|}}{C}}-R$$
$$\qquad\qquad |\quad\,\,|$$
$$\qquad\qquad OH\;OH$$

wherein $R_2$ is a member selected from the group consisting of hydrogen, phenyl, amino substituted phenyl, halo substituted phenyl, alkyl, hydroxyl substituted alkyl, halo substituted alkyl, alkenyl, and phenyl substituted alkyl, wherein $x$ is an integer ranging from 1 to 20 and $y$ is an integer ranging from 1 to 20.

The above-described amino hydroxyethers and a process for their preparation are described and claimed in my co-pending application, U.S. Serial No. 8,234, now abandoned. According to the process of Serial No. 8,234, now abandoned, the amino hydroxyethers are prepared by hydrogenating the corresponding nitro hydroxyethers. The nitro hydroxyethers which thus serve as intermediates in producing the amino hydroxyethers are prepared by oxyalkylating a nitro alcohol having the following general formula:

$$R-\underset{\underset{NO_2}{|}}{\overset{\overset{R}{|}}{C}}-(CH_2)_x OH$$

wherein R is a member selected from the group consisting of lower alkyl radicals and lower hydroxyalkyl radicals with a compound containing at least one $$-C\overset{O}{\overset{/\,\backslash}{-\!-\!-\!-}}C-$$

grouping in the presence of boron trifluoride.

The process of my co-pending application U.S. Serial No. 8,234, now abandoned while being a relatively efficient method for producing amino hydroxyethers, is subject to certain inherent disadvantages. For example, the time required for complete hydrogenation of the nitro hydroxyether is quite long. The yield of the intermediate nitro hydroxyether is relatively low and the many reaction steps are cumbersome and difficult to adapt to industrial production.

Previously, it has been observed that addition products of epoxides and amino alcohols give secondary and tertiary amine adducts instead of the desired amino hydroxyethers thereby necessitating the utilization of the corresponding nitro compounds as intermediates.

I have now discovered a method for producing amino hydroxyethers having the following general formula:

$$R-\underset{\underset{NH_2}{|}}{\overset{\overset{R}{|}}{C}}-(CH_2)_x-R_1$$

wherein R is a member selected from the group consisting of lower alkyl, lower hydroxy alkyl and a radical having the formula:

$$-(CH_2)_x-R_1$$

wherein $R_1$ is a member selected from the group consisting of the radicals:

$$-[O-CH_2-CH]_y OH$$
$$\qquad\qquad\quad |$$
$$\qquad\qquad\quad R_2$$

and $$-O-CH_2-CH-CH-CH_2-O-\underset{\underset{NH_2}{|}}{\overset{\overset{R}{|}}{C}}-R$$
$$\qquad\qquad |\quad\,\,|$$
$$\qquad\qquad OH\;OH$$

wherein $R_2$ is a member selected from the group consisting of hydrogen, phenyl, amino substituted phenyl, halo substituted phenyl, alkyl, hydroxyl substituted alkyl, halo substituted alkyl, alkenyl and phenyl substituted alkyl, wherein $x$ is an integer ranging from 1 to 20 and $y$ is an integer ranging from 1 to 20 directly from amino alcohols having the following general formula:

$$R_3-\underset{\underset{NH_2}{|}}{\overset{\overset{R_3}{|}}{C}}-(CH_2)_x OH$$

wherein $R_3$ is a member selected from the group consisting of lower alkyl radicals and lower hydroxyalkyl radicals without first producing the intermediate nitro hydroxyether. My new process is not only economical in allowing the utilization of cheap, available raw materials and convenient easily operated apparatus but is advantageous in its production of high conversions and good yields of amino hydroxyethers.

My new process for producing the above-mentioned amino hydroxyethers consists essentially of first reacting an amino alcohol having the following general formula:

$$R_3-\underset{\underset{NH_2}{|}}{\overset{\overset{R_3}{|}}{C}}-(CH_2)_x OH$$

wherein $R_3$ is a member selected from the group consisting of lower alkyl radicals and lower hydroxyalkyl radicals with sodium in an amount sufficient to provide 1 mol of sodium for each hydroxyl group of the aminoalcohol to be oxyalkylated, oxyalkylating the thus treated amino alcohol with a compound containing at least one $$-C\overset{O}{\overset{/\,\backslash}{-\!-\!-\!-}}C-$$

grouping to form an amino oxyalkylation product, treating the amino oxyalkylation product with water and carbon dioxide and recovering the thus produced amino hydroxyether.

Examples of amino alcohols used to prepare my compounds include 2-amino-2-methyl-1-propanol,
3-amino-3-methyl-2-butanol,
tris(hydroxymethyl)aminomethane,
2-amino-2-propyl-1-propanol,
2-amino-2-methyl-1-octanol,
2-amino-2-propyl-1-tridecanol,
2-amino-2-ethyl-1-nonadecanol,
etc., and the like.

The epoxides from which I prepare my compounds must contain at least one

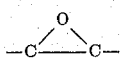

grouping. Representative epoxides include alkylene oxides such as ethylene oxide, butene-1-oxide, isobutylene oxide, butadiene monoxide, 1,2-epoxyoctane, 1,2-epoxytetradecane, 1,2-epoxynonadecane, etc.; alkylene dioxides such as butadiene dioxide etc.; halo substituted alkylene oxides such as chloropropylene oxide, bromopropylene oxide, etc.; phenyl substituted alkylene oxides such as 1,2-epoxyethylbenzene, 1,2 - epoxyoctylbenzene, 1,2 - epoxyheptadecylbenzene, etc.; aminophenyl substituted alkylene oxides such as 1,2-epoxyethylaminobenzene, etc.; halophenyl substituted alkylene oxides such as 1,2-epoxychlorobenzene, etc., and the like.

In carrying out my invention I add sodium preferably in the form of sodium sand or sodium methoxide to the amino alcohol preferably at a temperature ranging from about 50° C. to about 100° C. Then the thus treated amino alcohols are oxyalkylated using an epoxide at temperatures ranging from about 0 to about 150° C. to form an amino oxyalkylation product, the amino oxyalkylation product is then treated with water and carbon dioxide to form the amino hydroxyether and the thus formed amino hydroxyether is then recovered from the reaction mixture.

While the broad temperature range of from about 0 to about 150° C. and the broad pressure range of about atmospheric to about 20 p.s.i.g. is suitable for the oxyalkylation step of my reaction, I prefer to use temperatures ranging from about 90° C. to about 130° C. and pressures ranging from about 1 to about 5 p.s.i.g. When temperatures below the melting point of the amino alcohol used in my invention are utilized I prefer to use a solvent for the amino alcohol inert to the reactants and the reaction product. Examples of such solvents which are useful in my invention are xylene, carbon tetrachloride and dioxane, etc., and the like.

The molecular portions used in the oxyalkylating step of my invention can vary considerably depending on the amino alcohol and epoxide used and/or on the final product desired. Ordinarily, molar ratios of amino alcohol to epoxide of not less than 1 to 1 and not more than 1 to 20 respectively are useful in my process.

In carrying out the $CO_2$ step of my process I can first add water to the sodium treated amino alcohol to form a mixture and then add $CO_2$ to the mixture to produce the amino hydroxyether of my invention.

The amino hydroxyethers produced by the process of my invention can then be recovered by any suitable means such as distillation.

While I do not wish to be limited to any particular theory as to the reaction mechanism for my invention, I believe the explanation for the success of my process, which permits formation of amino hydroxyethers without utilization as intermediates of the corresponding nitro hydroxyethers, lies in the following example wherein the amino alcohol, 2-amino-2-methyl-1-propanol, and the epoxy compound, ethylene oxide, are used as illustrative compounds:

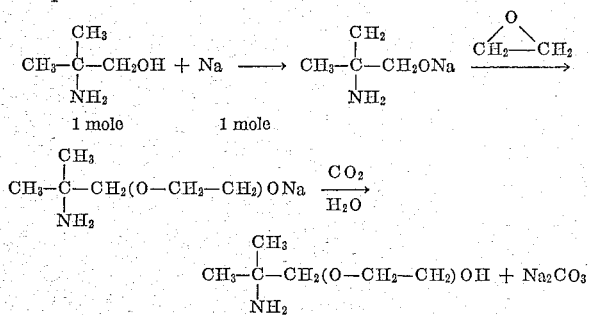

It is theorized from the above reaction mechanism that at least one mole of sodium is needed for each mole of amino alcohol having one hydroxyl group to prevent addition to the amine during the oxyalkylation step. Therefore, when amino diols are utilized, two moles of sodium for every mole of amino diol will be needed; and when amino triols are utilized, three moles of sodium for every mole of amino triol will be needed.

The following examples are offered to illustrate my invention; however, I do not intend to be limited to the specific materials, proportions and procedures shown. Rather, I intend for equivalents obvious to those skilled in the art to be included within the scope of my invention.

*Example I*

To a 1 liter flask containing 630 grams of 2-amino-2-methyl-1-propanol were slowly added 161 grams of sodium sand in xylene with accompanying agitation to form a uniform mixture. To the thus formed mixture were then added 300 milliliters of xylene. Ethylene oxide was added at atmospheric pressure and at room temperature for about 4 hours. At the end of the ethylene oxide addition, 126 grams of water were added to the mixture followed by the addition of 276 grams of carbon dioxide. After the carbon dioxide addition, the reaction product was allowed to stand for one hour. After the one-hour period, the reaction mixture was withdrawn from the container and $Na_2CO_3$ and other impurities were removed by filtration. The xylene and water were then separated from the reaction mixture by fractional distillation. The residue thus obtained was subjected to fractional distillation under vacuum. 2-methyl-6-hydroxy-4-oxa-2-hexylamine in the amount of 118.5 grams was collected.

The following data were determined for the compound:

| Found, percent | | | Calculated, percent | | |
|---|---|---|---|---|---|
| N | H | C | N | H | C |
| 10.52 | 11.17 | 53.45 | 10.5 | 11.3 | 54.1 |

*Example II*

2-amino-2-methyl-1-propanol and 1,2-epoxyethylbenzene were reacted by the process described in Example I to produce 2-methyl-9-hydroxy-4,7-dioxa-6,9-diphenyl-2-nonylamine.

*Example III*

2-amino-2-methyl-1-propanol and 1,2-epoxyoctylbenzene were reacted following the procedure of Example I to give 2-methyl-6-hydroxy-4-oxa-6-hexylphenyl-2-hexylamine.

*Example IV*

2-amino-2-methyl-1-propanol and 1,2-epoxyheptadecane were reacted following the procedure of Example I to give 2-methyl-9-hydroxy-4,7-dioxa-6,9-dipentadecyl-2-nonylamine.

*Example V*

2-amino-2-methyl-1-propanol and chloropropylene oxide were reacted following the procedure of Example I to give 2-methyl-6-hydroxy-4-oxa-6-chloromethyl-2-hexylamine.

*Example VI*

2-amino-2-methyl-1-propanol and 1,2-epoxyheptadecylbenzene were reacted following the procedure of Example I to give 2-methyl-9-hydroxy-4,7-dioxa-6,9-dipentadecylphenyl-2-nonylamine.

*Example VII*

2-amino-2-methyl-1-propanol and butadiene dioxide were reacted following the procedure of Example I to give 2,11-dimethyl-6,7-dihydroxy-4,9-dioxa-2,11-decanediamine.

*Example VIII*

2-amino-2-methyl-1-propanol and propylene oxide were reacted following the procedure of Example I to give 2-methyl-9-hydroxy-4,7-dioxa-6,9-dimethyl-2-nonylamine.

*Example IX*

3-methyl-3-amino-2-butanol were reacted with ethylene oxide following the procedure of Example I to give 2,3-dimethyl-6-hydroxy-4-oxa-2-hexylamine.

*Example X*

2-amino-2-methyl-1-hexanol and ethylene oxide were reacted following the procedure of Example I to give 2-amino-2-methyl-9-hydroxy-6-oxa-2-nonylamine.

*Example XI*

Tris(hydroxymethyl)aminomethane and ethylene oxide were reacted following the procedure of Example I to give tris(2-hydroxyepoxymethyl)methylamine.

Now having described my invention, what I claim is:

1. A process for the production of a compound having the following general formula:

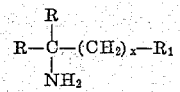

wherein R is a member selected from the group consisting of lower alkyl, lower hydroxyalkyl and a radical having the formula:

$$-(CH_2)_x-R_1$$

wherein $R_1$ is a member selected from the group consisting of the radicals:

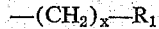

and

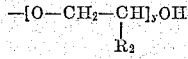

wherein $R_2$ is a member selected from the group consisting of hydrogen, phenyl, amino substituted phenyl, halo substituted phenyl, alkyl, hydroxyl substituted alkyl, halo substituted alkyl, alkenyl and phenyl substituted alkyl, wherein $x$ is an integer ranging from 1 to 20 and $y$ is an integer ranging from 1 to 20 which comprises interacting an amino alcohol having the following general formula:

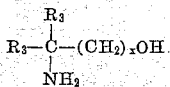

wherein $R_3$ is a member selected from the group consisting of lower alkyl and lower hydroxy alkyl, with sodium in an amount sufficient to provide 1 mol of sodium for each hydroxyl group of the amino alcohol to be oxylalkylated, oxyalkylating the resulting amino-ONa compound with a compound containing at least one

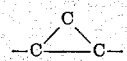

grouping selected from the group consisting of alkylene oxides, halo substituted alkylene oxides, phenyl substituted alkylene oxides, aminophenyl substituted alkylene oxides, halo phenyl substituted alkylene oxides, and alkylene dioxides, at temperatures ranging from about 0 to about 150° C. and at pressures ranging from atmospheric to 20 p.s.i.g. to form an amino sodium-containing oxyalkylation product, subsequently treating the amino sodium-containing oxyalkylation product with water and carbon dioxide and recovering the thus produced amino hydroxyether.

2. The process of claim 1 wherein the temperature ranges from about 90° C. to about 130° C. and the pressure ranges from about 1 to about 5 p.s.i.g.

3. The process of claim 1 wherein the reaction is carried out in the presence of a solvent inert to the reactants and the reaction products.

4. A process for the production of 2-methyl-9-hydroxy-4,7-dioxa-6,9-diphenyl-2-nonylamine which comprises interacting 2-amino-2-methyl-1-propanol with sodium in an amount sufficient to provide 1 mol of sodium for each hydroxyl group of the amino alcohol to be oxyalkylated, oxyalkylating the resulting amino-ONa compound with 1,2-epoxyethylbenzene at temperatures ranging from about 0 to about 150° C. and at pressures ranging from atmospheric to 20 p.s.i.g. to form an amino sodium-containing oxyalkylation product, and subsequently treating the amino sodium-containing oxylakylation product with water and carbon dioxide and recovering the thus produced amino hydroxyether compound.

5. A process for the production of 2-methyl-6-hydroxy-4-oxa-2-hexylamine which comprises interacting 2-amino-2-methyl-1-propanol with sodium in an amount sufficient to provide 1 mol of sodium for each hydroxyl group of the amino alcohol to be oxyalkylated, oxyalkylating the resulting amino-ONa compound with ethylene oxide at temperatures ranging from about 0 to 150° C. and at pressures ranging from atmospheric to 20 p.s.i.g. to form an amino sodium-containing oxyalkylation product, subsequently treating the amino sodium-containing oxyalkylation product with water and carbon dioxide and recovering the thus produced aminohydroxy ether compound.

6. A process for the production of 2-methyl-6-hydroxy-4-oxa-6-hexylphenyl-2-hexylamine which comprises interacting 2-amino-2-methyl-1-propanol with sodium in an amount sufficient to provide 1 mol of sodium for each hydroxyl group of the amino alcohol to be oxyalkylated, oxyalkylating the resulting amino-ONa compound with 1,2-epoxyoctylbenzene at temperatures ranging from about 0 to about 150° C. and at pressures ranging from about atmospheric to about 20 p.s.i.g. to form an amino sodium-containing oxyalkylation product, subsequently treating the amino sodium-containing oxylakylation product with water and carbon dioxide and recovering the thus produced amino hydroxyether compound.

7. A process for the production of 2-methyl-9-hydroxy-4,7-dioxa-6,9-dipentadecyl-2-nonylamine which comprises interacting 2-amino-2-methyl-1-propanol with sodium in an amount sufficient to provide 1 mol of sodium for each hydroxyl group of the amino alcohol to be oxyalkylated, oxyalkylating the resulting amino-ONa compound with 1,2-epoxyheptadecane at temperatures ranging from about 0 to about 150° C. and at pressures ranging from about atmospheric to about 20 p.s.i.g. to form an amino sodium-containing oxyalkylation product, subsequently treating the amino sodium-containing oxylakylation product with water and carbon dioxide and recovering the thus produced amino hydroxyether compound.

8. A process for the production of 2-methyl-6-hydroxy-4-oxa-6-chloromethyl-2-hexylamine which comprises interacting 2-amino-2-methyl-1-propanol with sodium in an amount sufficient to provide 1 mol of sodium for each hydroxyl group of the amino alcohol to be oxyalkylated, oxyalkylating the resulting amino-ONa compound with chloropropylene oxide at temperatures ranging from about 0 to about 150° C. and at pressures ranging from about atmospheric to about 20 p.s.i.g. to form an amino sodium-containing oxyalkylation product, subsequently treating the amino sodium-containing oxyalkylation product with water and carbon dioxide and recovering the thus produced amino hydroxyether compound.

9. A process for the production of 2-methyl-9-hydroxy-4,7-dioxa-6,9-dipentadecylphenyl-2-nonylamine which comprises interacting 2-amino-2-methyl-1-propanol with sodium in an amount sufficient to provide 1 mol of sodium for each hydroxyl group of the amino alcohol to be oxyalkylated, oxyalkylating the resulting amino-ONa compound with 1,2-epoxyheptadecylbenzene at temperatures ranging from about 0 to about 150° C. and at pressures ranging from atmospheric to 20 p.s.i.g. to form an amino sodium-containing oxyalkylation product, subsequently treating the amino sodium-containing oxyalkylation product with water and carbon dioxide and recovering the thus produced amino hydroxyether compound.

10. A process for the production of 2,11-dimethyl-6,7-dihydroxy-4,9-dioxa-2,11-decanediamine which comprises interacting 2-amino-2-methyl-1-propanol with sodium in an amount sufficient to provide 1 mol of sodium for each hydroxyl group of the amino alcohol to be oxyalkylated, oxyalkylating the resulting amino-ONa compound with butadiene dioxide at temperatures ranging from about 0 to about 150° C. and at pressures ranging from about atmospheric to about 20 p.s.i.g. to form an amino sodium-containing oxyalkylation product, subsequently treating the amino sodium-containing oxyalkylation product with water and carbon dioxide and recovering the thus produced amino hydroxyether compound.

11. A process for the production of 2-methyl-9-hydroxy-4,7-dioxa-6,9-dimethyl-2-nonylamine which comprises interacting 2-amino-2-methyl-1-propanol with sodium in an amount sufficient to provide 1 mol of sodium for each hydroxyl group of the amino alcohol to be oxyalkylated, oxyalkylating the resulting amino-ONa compound with propylene oxide at temperatures ranging from about 0 to about 150° C. and at pressures ranging from about atmospheric to about 20 p.s.i.g. to form an amino sodium-containing oxyalkylation product, subsequently treating the amino sodium-containing oxyalkylation product with water and carbon dioxide and recovering the thus produced amino hydroxyether compound.

12. A process for the production of 2,3-dimethyl-6-hydroxy-4-oxa-2-hexylamine which comprises interacting 3-methyl-3-amino-2-butanol with sodium in an amount sufficient to provide 1 mol of sodium for each hydroxyl group of the amino alcohol to be oxyalkylated, oxyalkylating the resulting amino-ONa compound with ethylene oxide at temperatures ranging from about 0 to about 150° C. and at pressures ranging from about atmospheric to about 20 p.s.i.g. to form an amino sodium-containing oxyalkylation product, subsequently treating the amino sodium-containing oxyalkylation product with water and carbon dioxide and recovering the thus produced amino hydroxyether compound.

13. A process for the production of 2-amino-2-methyl-9-hydroxy-6-oxa-2-nonylamine which comprises interacting 2-amino-2-methyl-1-hexanol with sodium in an amount sufficient to provide 1 mol of sodium for each hydroxyl group of the amino alcohol to be oxyalkylated, oxyalkylating the resulting amino-ONa compound with ethylene oxide at temperatures ranging from about 0 to about 150° C. and at pressures ranging from about atmospheric to about 20 p.s.i.g. to form an amino sodium-containing oxyalkylation product, subsequently treating the amino sodium-containing oxyalkylation product with water and carbon dioxide and recovering the thus produced amino hydroxyether compound.

14. A process for the production of 2-amino-2-methyl-19-oxa-21-hydroxy-2-heneicosylamine which comprises interacting 2-amino-2-methyl-1-nonadecanol with sodium in an amount sufficient to provide 1 mol of sodium for each hydroxyl group of the amino alcohol to be oxyalkylated, oxyalkylating the resulting amino-ONa compound with ethylene oxide at temperatures ranging from about 0 to about 150° C. and at pressures ranging from about atmospheric to about 20 p.s.i.g. to form an amino sodium-containing oxyalkylation product, subsequently treating the amino sodium-containing oxyalkylation product with water and carbon dioxide and recovering the thus produced amino hydroxyether compound.

15. A process for the production of tris(2-hydroxyepoxymethyl)methylamine which comprises interacting tris(hydroxymethyl)aminomethane with sodium an an amount sufficient to provide 1 mol of sodium for each hydroxyl group of the amino alcohol to be oxyalkylated, oxyalkylating the resulting amino-ONa compound with ethylene oxide at temperatures ranging from about 0 to about 150° C. and at pressures ranging from about atmospheric to about 20 p.s.i.g. to form an amino sodium-containing oxyalkylation product, subsequently treating the amino sodium-containing oxyalkylation product with water and carbon dioxide and recovering the thus produced amino hydroxyether compound.

16. A process for the production of a compound having the following general formula:

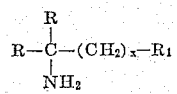

wherein R is a member selected from the group consisting of lower alkyl, lower hydroxyalkyl and a radical having the formula:

$$-(CH_2)_x-R_1$$

wherein $R_1$ is a member selected from the group consisting of the radicals:

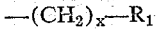

and

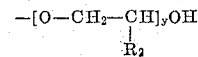

wherein $R_2$ is a member selected from the group consisting of hydrogen, phenyl, amino substituted phenyl, halo substituted phenyl, alkyl, hydroxyl substituted alkyl, halo substituted alkyl, alkenyl and phenyl substituted alkyl, wherein $x$ is an integer ranging from 1 to 20 and $y$ is an integer ranging from 1 to 20 which comprises interacting an amino alcohol having the following general formula:

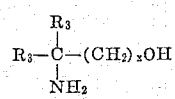

wherein $R_3$ is a member selected from the group consisting of lower alkyl and lower hydroxy alkyl, with sodium sand in an amount sufficient to provide 1 mol of sodium for each hydroxyl group of the amino alcohol to be oxyalkylated, oxyalkylating the resulting amino-ONa compound with a compound containing at least one

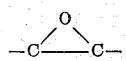

grouping selected from the group consisting of alkylene oxides, halo substituted alkylene oxides, phenyl substituted alkylene oxides, aminophenyl substituted alkylene oxides, halophenyl substituted alkylene oxides, and alkylene dioxides, at temperatures ranging from about 50 to about 100° C. and at pressures ranging from atmospheric to 20 p.s.i.g. to form an amino sodium-containing oxyalkylation product, subsequently treating the amino sodium-containing oxyalkylation product with water and carbon dioxide and recovering the thus produced amino hydroxyether.

17. A process for the production of a compound having the following general formula:

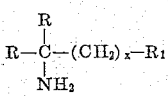

wherein R is a member selected from the group consisting of lower alkyl, lower hydroxyalkyl and a radical having the formula:

$$-(CH_2)_x-R_1$$

wherein $R_1$ is a member selected from the group consisting of the radicals:

$$-[O-CH_2-CH]_y OH$$
$$\phantom{-[O-CH_2-}|$$
$$\phantom{-[O-CH_2-CH]_y}R_2$$

and $$-O-CH_2-CH-CH-CH_2-O-\overset{R}{\underset{NH_2}{C}}-R$$
$$\phantom{-O-CH_2-}\overset{}{\underset{OH}{|}}\phantom{-}\overset{}{\underset{OH}{|}}$$

wherein $R_2$ is a member selected from the group consisting of hydrogen, phenyl, amino substituted phenyl, halo substituted phenyl, alkyl, hydroxyl substituted alkyl, halo substituted alkyl, alkenyl and phenyl substituted alkyl, wherein $x$ is an integer ranging from 1 to 20 and $y$ is an integer ranging from 1 to 20 which comprises interacting an amino alcohol having the following general formula:

$$R_3-\overset{R_3}{\underset{NH_2}{C}}-(CH_2)_x OH$$

wherein $R_3$ is a member selected from the group consisting of lower alkyl and lower hydroxy alkyl, with sodium methoxide in an amount sufficient to provide 1 mol of sodium for each hydroxyl group of the amino alcohol to be oxyalkylated, oxyalkylating the resulting amino-ONa compound with a compound containing at least one $$-C\overset{O}{\overset{/\backslash}{\text{———}}}C-$$

grouping selected from the group consisting of alkylene oxides, halo substituted alkylene oxides, phenyl substituted alkylene oxides, aminophenyl substituted alkylene oxides, halophenyl substituted alkylene oxides, and alkylene dioxides, at temperatures ranging from about 50 to about 100° C. and at pressures ranging from atmospheric to 20 p.s.i.g. to form an amino sodium-containing oxyalkylation product, subsequently treating the amino sodium-containing oxyalkylation product with water and carbon dioxide and recovering the thus produced amino hydroxyether.

References Cited in the file of this patent
UNITED STATES PATENTS

| | | |
|---|---|---|
| 2,782,240 | Hefner et al. | Feb. 19, 1957 |
| 2,871,266 | Riley | Jan. 27, 1959 |
| 2,944,984 | De Groote et al. | July 12, 1960 |